United States Patent
Miller et al.

(10) Patent No.: US 10,371,284 B2
(45) Date of Patent: Aug. 6, 2019

(54) LOCAL POSITION INDICATOR FOR SUBSEA ISOLATION VALVE HAVING NO EXTERNAL POSITION INDICATION

(71) Applicant: BAKER HUGHES, A GE COMPANY, LLC, Houston, TX (US)

(72) Inventors: Wade A. Miller, Broken Arrow, OK (US); Michael L. Hair, Tulsa, OK (US); Leonard Medill, Bixby, OK (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 296 days.

(21) Appl. No.: 15/044,950

(22) Filed: Feb. 16, 2016

(65) Prior Publication Data

US 2017/0234454 A1 Aug. 17, 2017

(51) Int. Cl.
*F17D 3/00* (2006.01)
*F16K 37/00* (2006.01)
*F16K 31/122* (2006.01)

(52) U.S. Cl.
CPC ........ *F16K 37/0016* (2013.01); *F16K 31/122* (2013.01); *F16K 37/0041* (2013.01)

(58) Field of Classification Search
CPC ............. F15B 15/2815; F16K 37/0016; F16K 37/0066; F16K 37/0041; F16K 37/0008; E21B 21/08; G01L 7/16
USPC .................. 137/553, 557; 73/744, 152.51
See application file for complete search history.

(56) References Cited

U.S. PATENT DOCUMENTS

| | | | |
|---|---|---|---|
| 1,016,519 A * | 2/1912 | Predock et al. | B60C 23/0496 137/230 |
| 1,089,326 A * | 3/1914 | cHilson | B60C 23/0496 137/557 |
| 1,341,542 A * | 5/1920 | Buchanan | G01L 7/16 73/744 |
| 3,077,179 A | 2/1963 | Evanson | |
| 3,285,061 A * | 11/1966 | Hegenbart | F15B 7/00 177/208 |
| 4,901,798 A * | 2/1990 | Amani | E21B 34/10 166/311 |
| 5,890,450 A | 4/1999 | Hamell et al. | |
| 6,173,785 B1 | 1/2001 | Adams et al. | |
| 7,533,693 B2 | 5/2009 | Colton et al. | |
| 7,743,833 B2 * | 6/2010 | Cascario | E21B 34/10 166/332.8 |
| 8,176,975 B2 | 5/2012 | Lake et al. | |
| 2006/0157240 A1 | 7/2006 | Shaw et al. | |

(Continued)

*Primary Examiner* — Angelisa L. Hicks
(74) *Attorney, Agent, or Firm* — Shawn Hunter (57) ABSTRACT

A local position indicating device for a subsea isolation valve that has no other visual signals of its position integrates to the hydraulic actuation system for the isolation valve. Three way valves, connected to an operating control line and a force closed balance line leading to opposed ends of an operating piston, are located by the isolation valve and redirected by a diver or ROV, to locally operate the valve. The balance line has a piston that is displaced with fluid pushed by the operating piston when the isolation valve is opened with hydraulic pressure in the operating control line local connection. The piston connected to the balance line moves an indicator out of its housing for the local indication that the isolation valve is open. Displaced fluid from movement of the piston in the position indicator moves a floating piston to keep seawater away from the indicating piston.

27 Claims, 6 Drawing Sheets

(56) References Cited

U.S. PATENT DOCUMENTS

2011/0186303 A1* 8/2011 Scott .................... E21B 34/066
  166/373
2012/0234410 A1   9/2012 Borchgrevink et al.
2013/0230389 A1* 9/2013 Giannotta ........... F15B 15/2838
  415/173.2

* cited by examiner

LOCAL POSITION INDICATOR FOR SUBSEA ISOLATION VALVE HAVING NO EXTERNAL POSITION INDICATION

FIELD OF THE INVENTION

The field of the invention is a local position indicator for a subsea valve that has no external indications of valve position.

BACKGROUND OF THE INVENTION

Figure 1:
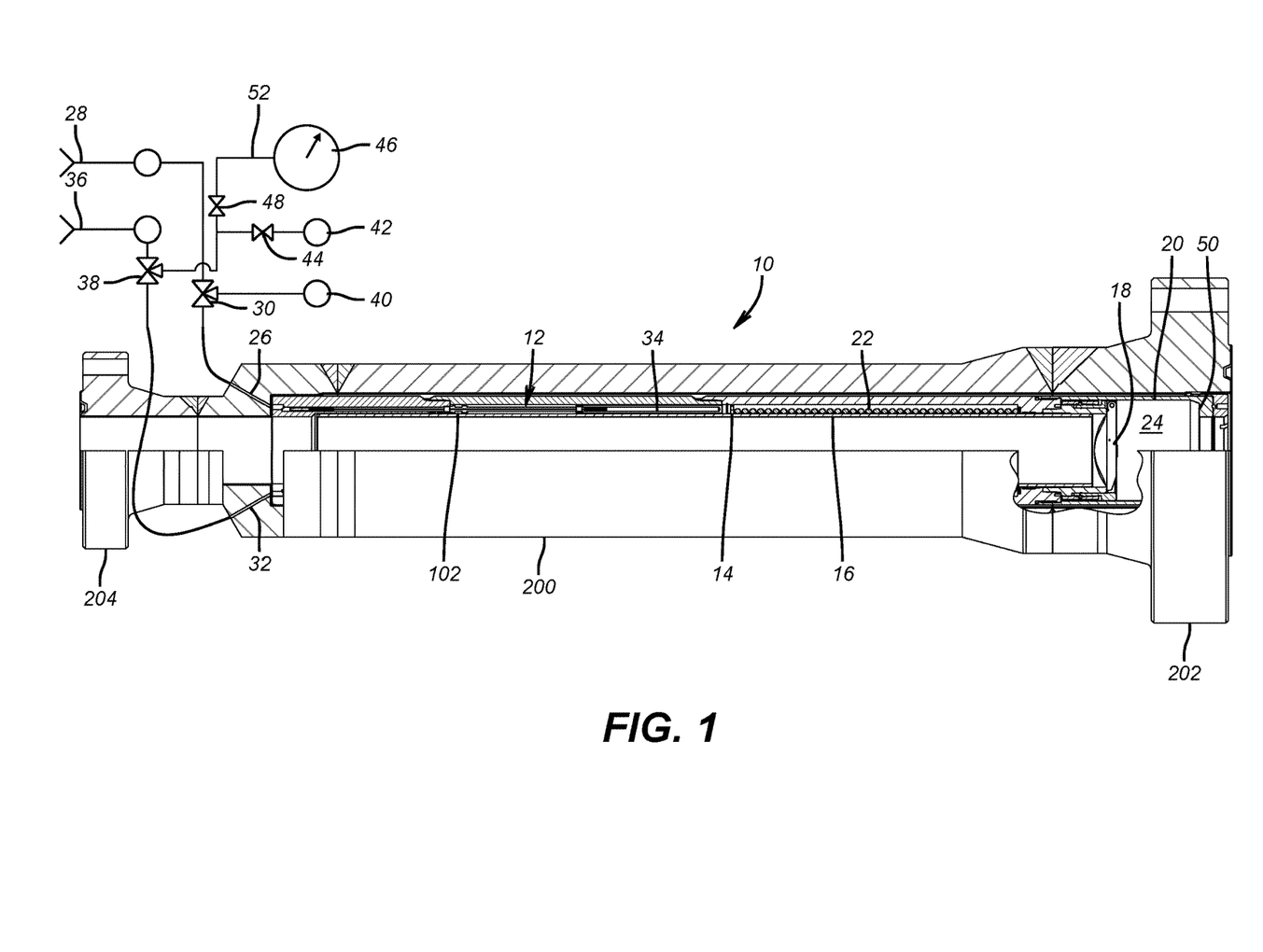
FIG. 1 is a part sectional view of the isolation valve schematically showing the hydraulic control system with position indicator.
Figure 2:
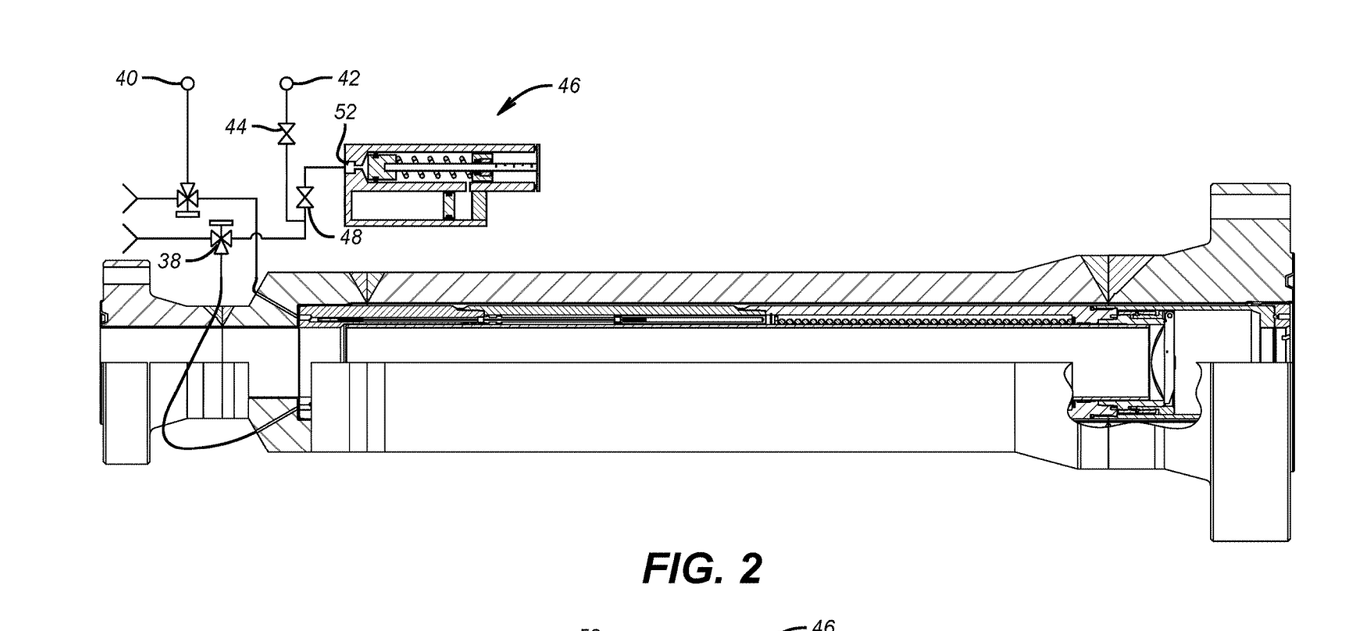
FIG. 2 is the view of FIG. 1 with a detailed view of the position indicator in the isolation valve closed position.

A context reference for the present invention is Pressure-Balanced Rod Piston Control System for a Subsurface Safety Valve U.S. Pat. No. 6,173,785 B1. The operating mechanism for the isolation valve for subsea use will be very similar to that which is shown in FIGS. 1 and 2 of this patent. In fact, the pressure balance functionality of the operating mechanism unchanged; however, with the present invention it will be improved to offer a local visual, tactile indication of the valve's position to a diver or Remotely Operated Vehicle (ROV).

Many subsea isolation valve installations such as those involving a semisubmersible rig use hydraulically operated plug or ball valves coupled to large hydraulic operators for quarter turn operation between open and closed positions. Because of the high operating pressures and the line sizes involved these valves are extremely heavy and have a fairly large profile exposed to wave action. As a result such weight must be offset with buoyancy and the fixation system for the rig has to resist the loads from wave action and underwater currents against the large profiles of these valves and their operators.

To address these issues the present invention proposes to use subsurface safety valves (SSV) of the type well known in the art in place of the heavy and high profile valves now being used as subsea isolation valves. Apart from the above reference, the following references illustrate the state of the SSV art and position indication art: U.S. Pat. No. 8,176,975; US 20060157240; U.S. Pat. Nos. 7,533,693; 3,077,179; 5,890,450 and US 20120234410.

Apart from using an SSV as a subsea isolation valve, other novel features of the present invention are the ability to put an external position indication to that valve and the manner in which such an external indication system operates. The internal workings of the known SSV need not be modified. Instead, the hydraulic system operates the local indication feature. The hydraulic system normally has discrete lines leading to opposed ends of an operating piston for the SSV. Movement of the operating piston moves a flow tube against a flapper for the open position. A closure spring closes the valve by pushing up the flow tube when pressure is released in the operating control line. The force closed line goes to the back side of the operating piston and can be used to force the operating piston back up to close the valve when the closure spring fails to do so. The present invention provides local hydraulic taps into those two control lines for local operation by a diver or an ROV. The local position indicator is preferably integrated into the force close line for the main reason that such line operates at significantly lower pressures than the pressures seen in the operating control line. The position indicator is a volumetric displacement device. The volume displaced by the operating piston is the volume pushed to the position indicator. Depending on the relative diameters of the operating piston compared to the indicating piston the movement of the indicating piston will be the same or different than the movement of the operating piston. In this manner the application of the known SSV design to a subsea application will not require internal valve modifications to meet the requirements of API-6A/6DSS/17D standards. The indicator mechanism can be configured to be depth insensitive to seawater. The indicator can be calibrated as part of the manufacturing and assembly process in conjunction with its associated valve to compensate for any trapped compressible fluids in the system. The indicator piston can displace trapped fluid against a floating piston to isolate the indicating piston and its seals from seawater. These and other features of the present invention will be more readily apparent to those skilled in the art from a review of the detailed description of the preferred embodiment and the associated drawings while recognizing that the full scope of the invention can be determined from the appended claims.

SUMMARY OF THE INVENTION

A local position indicating device for a subsea isolation valve that has no other visual signals of its position integrates to the hydraulic actuation system for the isolation valve. Three way valves, connected to an operating control line and a force closed balance line leading to opposed ends of an operating piston, are located by the isolation valve and redirected by a diver or ROV, to locally operate the valve. The balance line has a piston that is displaced with fluid pushed by the operating piston when the isolation valve is opened with hydraulic pressure in the operating control line local connection. The piston connected to the balance line moves an indicator out of its housing for the local indication that the isolation valve is open. Displaced fluid from movement of the piston in the position indicator moves a floating piston to keep seawater away from the indicating piston.

DETAILED DESCRIPTION OF THE PREFERRED EMBODIMENT

FIG. 1 shows an isolation valve located subsea inside a housing 200 that has opposed flanged ends 202 and 204 associated with a riser leading to an adjacent platform that are not shown. The housing 200 allows the use of a borehole safety valve in a subsea application where threaded connections that are typically used on borehole safety valves is not permitted. The isolation valve 10 can be taken as used in a borehole and put in a housing 200 and flanged to a marine riser to present advantages of weight savings and a low profile to minimize the drag resulting from underwater currents which plagues the existing style of hydraulically actuated ball valves typically used in this service. Control lines 28 and 36 sealingly connect to connections 26 and 32 of the isolation valve 10 through the housing 200. Internally, the isolation valve 10 is a known design with an operating hydraulic piston assembly 12 connected to an upset 102 on a flow tube 16. Movement of the flow tube 16 against a flapper 18 rotates the flapper 18 into recess 20 as the flow tube 16 advances. Advancing of the flow tube 16 compresses the closure spring 22 while opening passage 24 as the flapper 18 is pushed behind the flow tube 16 for the open position of the isolation valve 10. Connection 26 is above the piston assembly 12 such that pressure applied from the offshore platform through line 28 when three way valve 30 is aligned for straight through flow will force the piston assembly 12 down for the open position of the isolation valve 10. Conversely removing pressure at the platform (not shown) at line 28 will allow the closure spring 22 to push up tab 14 on the flow tube 16 to let the flapper 18 rotate back to the closed position shown in FIG. 1. Typically, flapper 18 will have a pivot spring to urge the flapper 18 up to the FIG. 1 closed position as the flow tube 16 is pushed up by spring 22.

Connection 32 terminates at location 34 on the opposite side of the piston assembly 12 from connection 26. Hydraulic line 36 comes from the platform through three way valve 38 and onto connection 32 when the three way valve 38 is aligned for straight through flow. The three way valves 30 and 38 are locally mounted subsea near the isolation valve for operation by a diver or an ROV or they can be remotely operated from the platform through an umbilical line running past the three way valve locations if there is an operator associated with those valves. Pressure in line 36 can force the piston assembly 12 in the bias direction of spring 22 in the event that pressure removal in line 28 at the platform and the force of spring 22 fail to move the piston assembly 12 to the isolation valve 10 closed position shown in FIG. 1. The presence of line 36 is also used to oppose the hydrostatic pressure in line 28 so that the closure spring 22 is insensitive to control line hydrostatic pressure at the location of the isolation valve 10. The local indication system is properly operated by the three way valves 30 and 38 so that the position of the isolation valve 10 can be visually determined locally to meet API standards mentioned above.

During platform operation, operating control line 28 is aligned through valve 30 to connection 26 while forced close control line 36 is aligned through valve 38 to connection 32. In normal operation, pressure is applied to operating control line 28 to open isolation valve 10 and the pressure is removed from operating control line 28 to allow spring 22 to close the isolation valve 10.

To enable local operation with a diver or ROV, the pressure in line 28 is removed to put the isolation valve 10 in the closed position. The fact that isolation valve 10 is closed can be confirmed on the platform. It is important to take these steps first to prevent liquid lock in the control system as will be explained below. With the isolation valve 10 in the closed position of FIG. 1 and a diver or ROV having connected to connections 40 and 42, the position of the three way valves can be changed to isolate the platform and enable operation of the isolation valve 10 locally by the diver or ROV through connections 40 and 42. Connection 40 becomes the origin of the operating control line that leads through three way valve 30 to connection 26. This alignment is automatic on operation of the three way valve 30. Connection 42, after valve 44 is opened and three way valve 38 is operated, now becomes the force closed control line to connection 32. Valve 44 can optionally isolate connection 42 or enable it for force closed operation of the isolation valve 10. When valve 44 is closed, the hydraulic fluid displaced by movement of the piston assembly 12 is directed to the position indication system 46. The position indication system 46 is shown schematically in FIG. 1 to illustrate its placement in the hydraulic system behind shutoff valve 48 that is operated after isolation valve 10 is in the closed position followed by operation of the three way valves 30 and 38 with the connections 40 and 42 connected to a hydraulic pressure source by a diver or an ROV. Valve 48 allows the position indication system 46 to be removed for maintenance while the isolation valve 10 is normally operated from the platform.

Before discussing the details of the position indication system 46, those skilled in the art will appreciate that movement of piston assembly 12 against spring 22 will displace a given volume of hydraulic fluid ahead of the piston assembly 12 and the amount depends on the piston area multiplied by the distance the operating piston assembly 12 moves to get the flow tube 16 to a travel stop 50. That volume of hydraulic fluid displaced by the piston assembly 12, with valve 48 open and valve 44 closed or with connection 42 otherwise prevented from taking displaced fluid from the movement of the piston assembly 12, will now go into the position indication system 46 at its inlet 52.

Figure 3:
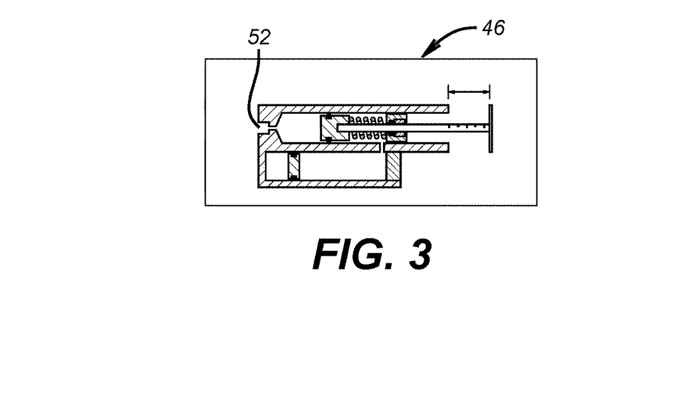
FIG. 3 is the view of the position indicator in the isolation valve open position.

FIG. 2 shows the position indication system 46 in the isolation valve 10 closed position while FIG. 3 shows the system 46 in the isolation valve 10 open position. The system 46 is shown enlarged in FIGS. 4 and 5 and is first introduced in FIGS. 2 and 3 to show its juxtaposition to the isolation valve 10 and the associated hydraulic circuits described above.

Figure 5:
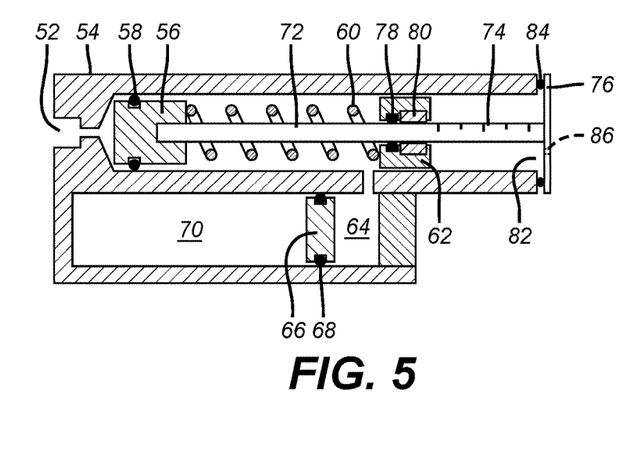
FIG. 5 is an enlarged view of the position indicator of FIG. 2.

FIG. 5 will be used to describe the position indication system for the closed position of the isolation valve 10. Hydraulic fluid displaced by piston assembly 12 enters inlet 52 of housing 54 to apply pressure against indicating piston 56 that has a seal 58. Spring 60 pushes piston 56 toward inlet 52. Spring 60 is supported at support 62. Movement of indicating piston 56 displaces hydraulic fluid in a sealed variable volume chamber 64 that is in part defined by a floating piston 66 that has a seal 68. On the opposite side of the floating piston 66 is a low pressure variable volume chamber 70 that can be at atmospheric or some other low pressure and can be air or an inert compressible fluid such as nitrogen.

Figure 6:
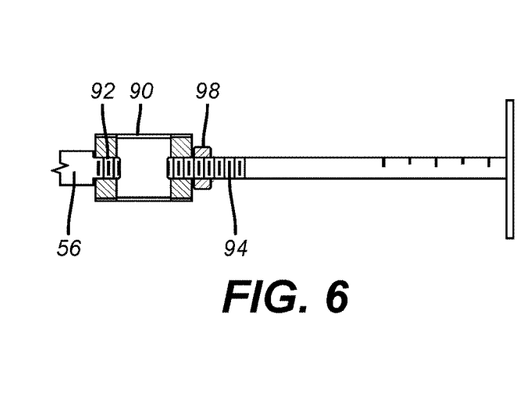
FIG. 6 is a detailed view of the calibration system for the position indication rod.

Indicating piston 56 is connected to indicating rod 72 that has graduations 74 and an end plate 76. FIG. 6 shows a way to axially adjust the rod 72 with respect to its extension from piston 56 and will be described in more detail below. Rod 72 is sealed at seal 78 to isolate the hydraulic fluid in chamber 64 from seawater. A wiper 80 is next to seal 78 to keep solids in the seawater away from seal 78. In the closed position the plate 76 can be in contact or near open end 82 of housing 54. Optionally, a seal 84 can be on end 82 if for nothing else than to be a shock absorber for the plate 76 when the bias of spring 60 moves piston 56 toward inlet 52 indicating the isolation valve closed position of FIG. 5. It may also be advantageous to have one or more ports open in plate 86 to minimize the prospect of sticking the plate 76 to the housing 54.

Figure 4:
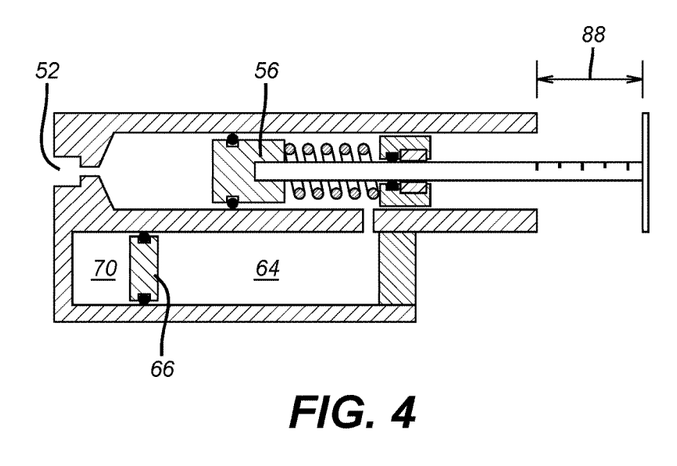
FIG. 4 is an enlarged view of FIG. 3.

Referring to FIG. 4 as the pressure is raised at subsea connection 40 or through platform supply 28, the piston assembly 12 of the isolation valve 10 pushes fluid toward inlet 52 to overcome the force of spring 60 and displace fluid in chamber 64 against the floating piston 66 reducing the volume of chamber 70. Movement of indicating piston 56 extends graduations 74 out of housing opening 82 to give the reading of percent open indicated by arrow 88. It should be noted that if the actuating piston assembly 12 is the same diameter as piston 56 they will each move the identical distance as a predetermined volume of hydraulic fluid is displaced. If piston 56 has a smaller diameter than piston assembly 12 then piston 56 will move further than piston assembly 12 and vice versa. Spring 60 overcomes friction in seal 58 to force piston 56 toward inlet 52 as the isolation valve 10 is allowed to move to the closed position. In FIGS. 4 and 5 the design of piston 56 is close to being insensitive to seawater hydrostatic pressure with the net force on piston 56 toward inlet 52 from seawater hydrostatic equal to the force acting on the cross-sectional area of the rod 72 connected to the piston 56.

While the rod 72 can be threaded to piston 56 to bottom into a blind bore as shown in FIGS. 4 and 5, an adjustment mechanism shown in FIG. 6 can be used featuring a turn-buckle 90 threaded at 92 to the piston 56 with the other end 96 receiving threads 94 of rod 72 and a lock nut 98 holding the position of rod 72 with respect to the turnbuckle 90. The reason for this adjusting and locking system is that when the isolation valve's hydraulic circuit for balance/force close feature is charged with incompressible hydraulic fluid there may be a pocket of compressible gas. This means that some pressure from the piston assembly 12 tending to move fluid out of the isolation valve's hydraulic circuit for balance/force close will instead simply compress some of the remaining compressible fluid in that chamber rather than displacing the fluid into the position indicating system 46 to give an inaccurate reading of the percent open for the isolation valve 10. In the shop after the isolation valve is hooked up and while the flapper 18 position can be verified visually through the flanged end 202, the adjustment described in FIG. 6 can be used to insure the plate 76 is in when the isolation valve 10 is closed and reading 100% open when the isolation valve is wide open, the two extreme positions shown in FIGS. 4 and 5.

Figure 7:
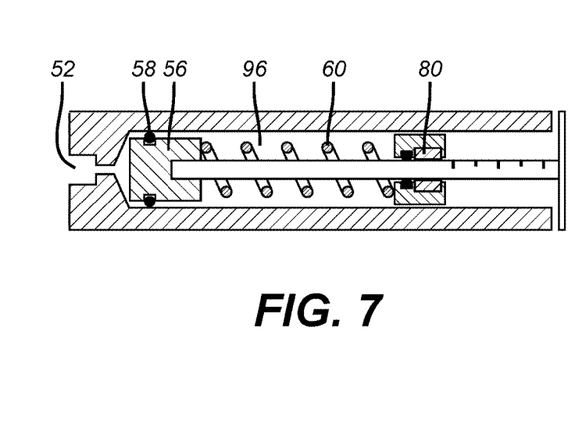
FIG. 7 shows a position indicating rod exposed to seawater.

FIG. 7 shows an even simpler configuration of the position indicating system 46. Here the system is sensitive to the hydrostatic pressure of the seawater because only the wiper 80 is used without seal 78 shown in FIGS. 4 and 5. As a result seawater gets into the chamber 96 where spring 60 is located. The floating piston 66 and chamber 70 become unnecessary. In this version additional pressure needs to be applied at connection 26 to open the isolation valve 10 but the load on the closure spring 22 is reduced by a like amount as the seawater hydrostatic works in the same direction to try to close the isolation valve 10. In this version the spring 60 is optional as the seawater hydrostatic should normally be sufficient to overcome friction of seal 58 when pressure is reduced at connection 26 to allow the isolation valve 10 to close.

Figure 8:
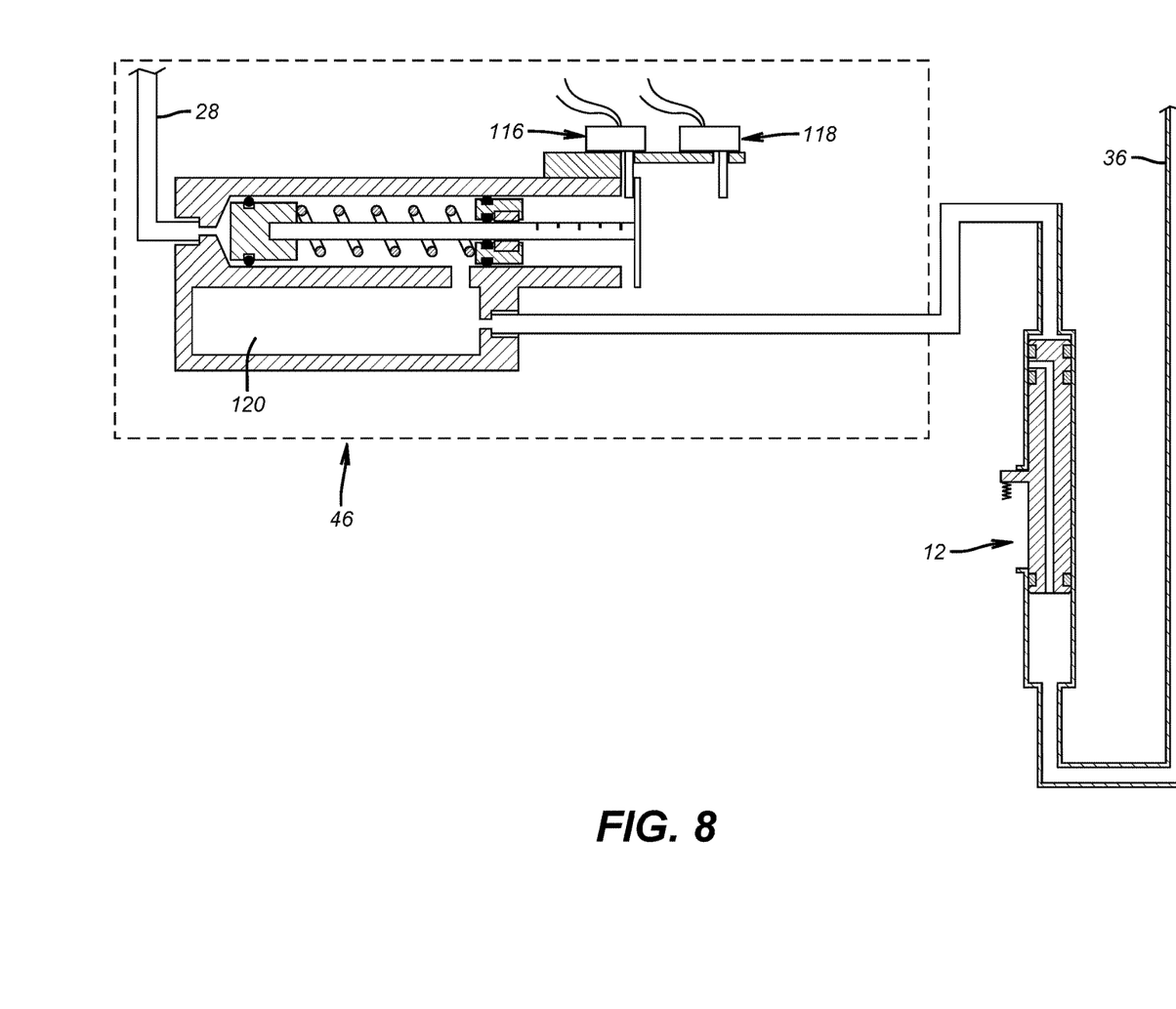
FIG. 8 shows a position indicator connected to an operating control line in the isolation valve closed position.
Figure 9:
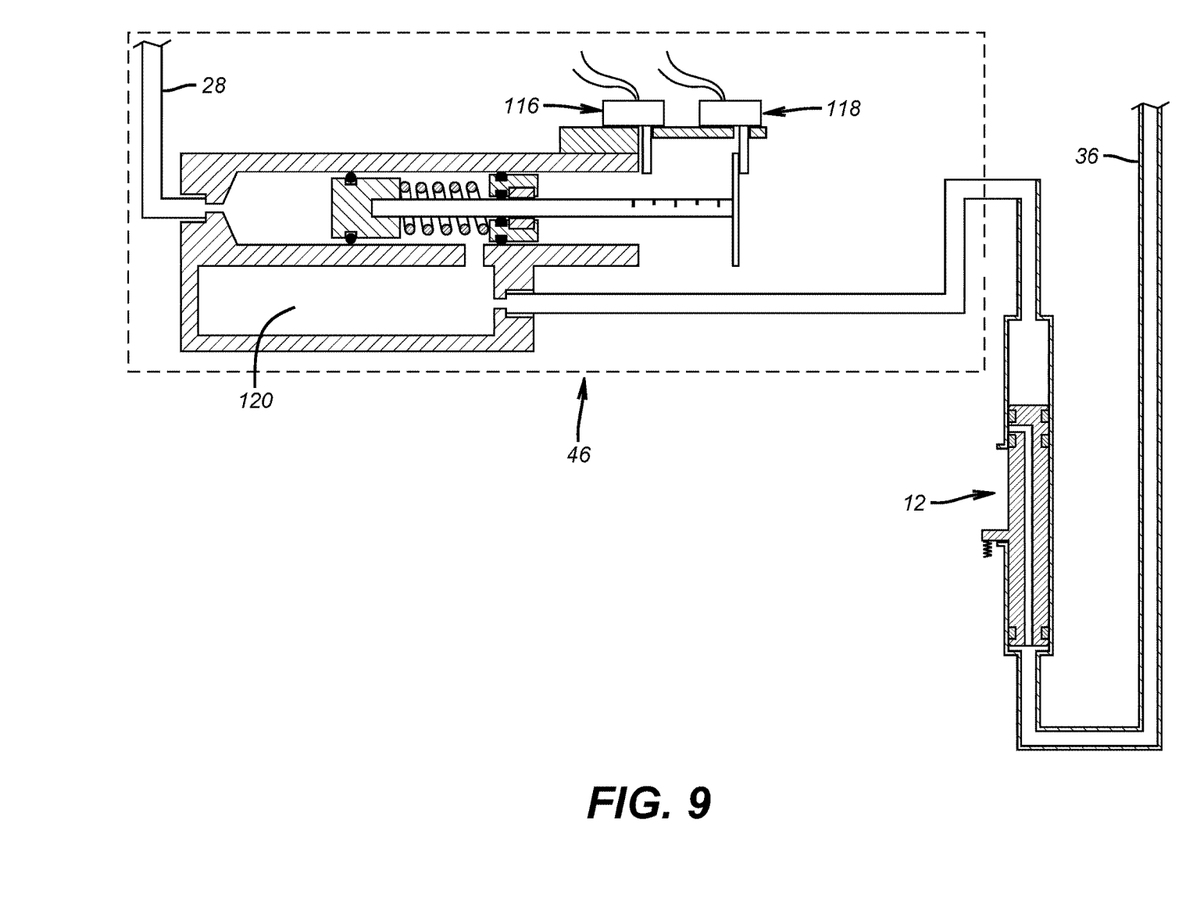
FIG. 9 is the view of FIG. 8 in the isolation valve open position.

FIGS. 8 and 9 show an alternative placement of the position indication system 46 on the operating control line 28 leading to connection 26. Here the operating piston assembly 12 is shown schematically in the valve closed position in FIG. 8 and the isolation valve 10 open position in FIG. 9. In this positioning the piston 56 has to displace a volume needed to move the piston assembly 12 so that the flow tube 16 hits the travel stop 50. If the pistons are the same diameter they will both move equal amounts as pressure builds in line 28. At the same time the rod 72 extends as previously described to give the percent open indication. The big difference here is that the position indicating system 46 is continuously active (in lieu of intermittently active during ROV or diver witness as discussed in the previous embodiment), indicating the position of the valve at all times. In addition, the line 28 sees the higher pressure needed to compress spring 22 so that the seals and the components of the position indication system 46 will need to be rated at a much higher pressure on the order of 10,000 PSI. This placement makes the system 46 more expensive and less preferred for local indication to a diver or ROV. However, its usefulness is appreciated in that if electronic contact switches 116 and 118 are configured to the system 46 as shown in FIG. 8 and FIG. 9 the continuously active position indicating system could be used to relay an open/close electric signal to the platform for round-the-clock monitoring.

FIGS. 8 and 9 show the position indicating system 46 plumbed into the control line 28, in lieu of the balance line 36, which is an alternate embodiment. In this configuration, the position indicating system would function continuously (always indicating the subsea isolation valve's position). In this embodiment, as fluid from control line 28 is pushed into the system 46 an equivalent volume of fluid is displaced from reservoir 120 into the subsea isolation valve connection 26 to open the valve. Throughout which time, spring 60 and closure spring 22 are operatively compressed in conjunction with the movement of fluid. Although continuous position indication could be beneficial if the end user wanted an indicator that showed valve position at all times (even in the absence of a diver or ROV), the preferred embodiment for local indication only would likely be one that is used intermittently (as needed). With the continuous indication embodiment (FIG. 8 and FIG. 9) the system 46 must be designed for much higher operating pressures. Further, if the fixed fluid volume between the system 46 and the isolation valve were to leak, the end user could experience a situation where the valve would be unable to fully open due to the lack of fluid. The indicator would also need to be designed for a higher number of cycles (if it were to function continuously). Consequently, the simpler solution is to have a position indicator that is tied into the balance line 36.

Since FIGS. 8 and 9 present a solution for continuously active indication, electric limit switches (contact switches) 116 and 118 or other ways to transmit the position of plate 76 could be added allowing the indicator to send a signal to the platform for electronic monitoring or monitoring using other technologies.

Figure 10:
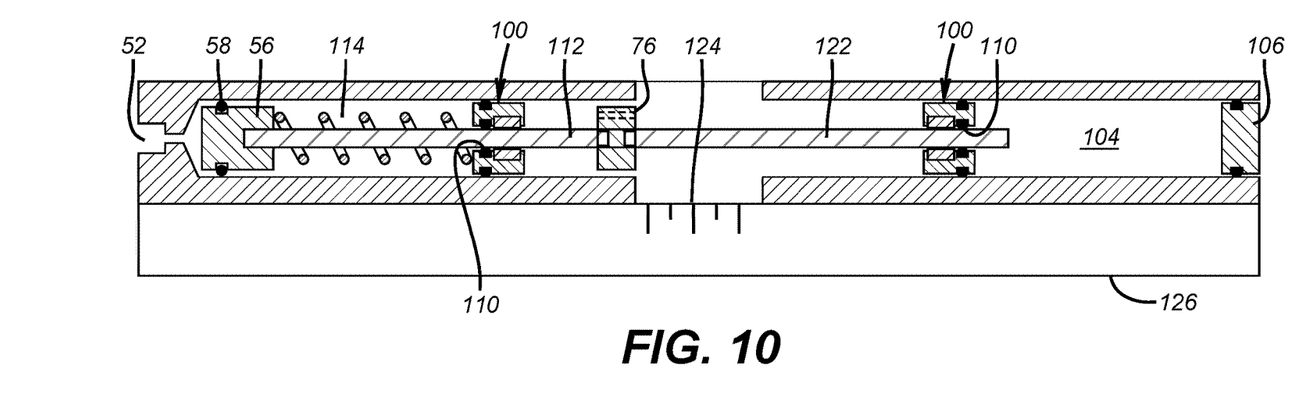
FIG. 10 shows the position indicator configured to be insensitive to seawater hydrostatic with the isolation valve in the closed position.
Figure 11:
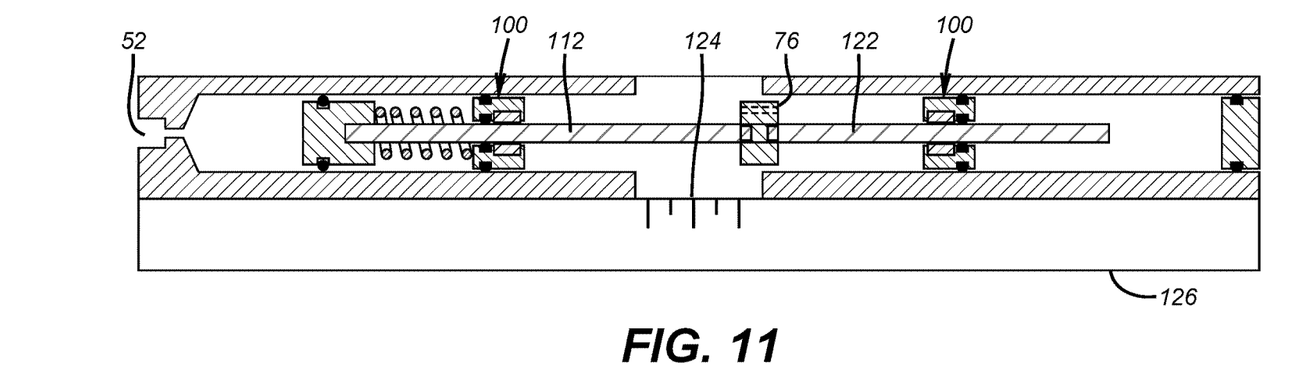
FIG. 11 is the view of FIG. 10 with the isolation valve in the open position.

FIGS. 10 and 11 unlike FIGS. 4 and 5 make the system 46 totally independent of seawater hydrostatic pressure. Here rods 112 and 122 on both sides of plate 76 are the same outer diameter and sealingly extend into piston retainers 100 on both sides with static rod seals 110. Given that rods 112 and 122 are equal in outer diameter the seawater hydrostatic does not bias the system 46 in either direction. The system 46 has variable volume cavities 104 and 114 that are at atmospheric or another low pressure that offers no substantial force against piston 56 and rod 122 in the direction of inlet 52. Chamber 104 is sealed by end cap 106. Indicating graduations 124 appear on the indicator's outer housing 126 so that in a part open position the percentage open can be read with respect to the position of the plate 76. Since these graduations are on the exterior of the system 46 and easily accessible, they can be applied after the system is attached to the associated subsea isolation valve and tested for proper calibration (in the shop). The normal operating position for the subsea isolation valve is closed or wide open.

Those skilled in the art will appreciate that the present invention provides for the use of a lighter valve with a low profile in a subsea application whose use is viable because a local position indication system is fitted to the valve externally through its control line operating system. Although a two line system is described the position indication system can be operable in a one line system with adjustment to the size of the closure spring. Using the hydraulic fluid displaced by the operating piston gives a direct readout of valve position as the operating piston fluid displacement winds up being the fluid displaced by the position indicating piston or the other way around. The position indicating piston can be independent of seawater hydrostatic in a configuration where the indicating piston is isolated from seawater. Alternatively the indicating system can be simplified by allowing seawater hydrostatic to get to the indicating piston in which case seawater hydrostatic acts on the piston meaning that a higher pressure is needed in the operating control line while the closure spring force can be reduced. The indicating system can be placed in the operating control line but its components will see higher operating pressures than a location in a force closed control line. The indicating rod can be position adjusted relative to the indicating piston with an adjustment assembly as in FIG. 6 to compensate for any remaining compressible fluid that may be trapped in isolation valve's hydraulic circuit for balance/force closure.

The above description is illustrative of the preferred embodiment and many modifications may be made by those skilled in the art without departing from the invention whose scope is to be determined from the literal and equivalent scope of the claims below:

1. A valve position indicating assembly located subsea for a valve comprising a valve member operated by at least one hydraulic control line, said valve having no visible external indication of a position of said valve member, comprising:
a housing having an inlet in fluid communication with said at least one control line;
an indicating piston in said housing, said indicating piston exposed to control line pressure on one side of a piston seal thereon and acted upon directly or indirectly by subsea hydrostatic pressure on an opposite side of said piston seal, said indicating piston moving responsively to a variable volume of hydraulic fluid delivered from and sent to said control line;
an indicating member moving with said indicating piston and selectively extending to be visible from an opening in said housing to provide a visual subsea indication of position for the valve.

2. The assembly of claim 1, wherein:
said indicating piston defines a first sealed variable volume in said housing.

3. The assembly of claim 2, wherein:
said indicating member extending from and beyond said first sealed variable volume.

4. The assembly of claim 3, wherein:
said indicating piston is biased from within said first variable volume toward said inlet.

5. The assembly of claim 3, further comprising:
a floating piston further defining said first sealed variable volume on one side thereof and a second variable volume at about atmospheric pressure in said housing.

6. The assembly of claim 3, wherein:
said indicating member comprising a seal to retain fluid in said first sealed variable volume chamber from another fluid at said outlet.

7. The assembly of claim 2, wherein:
said indicating member is adjustably mounted to said indicating piston for greater or lesser axial extension from said indicating piston and further comprises a lock for maintaining a predetermined extension.

8. The assembly of claim 1, wherein:
said indicating piston is insensitive to pressure outside said opening.

9. The assembly of claim 8, further comprising:
a second piston mounted to said indicating member in said housing having the same piston area as said indicating piston, with said opening in said housing between said pistons.

10. The assembly of claim 9, wherein:
said second piston defining a second sealed variable volume in said housing initially about atmospheric pressure.

11. The assembly of claim 9, further comprising:
a floating piston further defining said first sealed variable volume on one side thereof and a third variable volume at about atmospheric pressure in said housing.

12. The assembly of claim 9, wherein:
said indicating member comprises scales extending on opposed sides of an end plate, said scales visible as said end plate moves axially in said opening.

13. The assembly of claim 1, wherein:
said indicating member comprises a scale extending to an end plate, said scale visible as said end plate moves away from said opening and moving into said housing as said end plate moves toward said opening.

14. The assembly of claim 1, wherein:
said indicating piston is exposed to fluid at said opening of said housing.

15. The assembly of claim 1, wherein:
the valve is operated by an operating and a force closed control lines and said inlet of said housing is connected to either control line.

16. The assembly of claim 1, wherein:
movement of said indicating member triggers a signal to a remote location of the position of said valve.

17. A subsea hydraulically operated valve assembly for isolation in a tubular string, comprising:
a valve hydraulically operated through at least one control line between an open and a closed position without a visible indication of position;
a position indicating assembly operably connected to said at least one control line responsive to a variable volume of hydraulic fluid moving between said control line and said position indicating assembly to visually indicate valve position subsea related to said moving volume.

18. An indicating method for a subsea hydraulically operated isolation valve having no external indication of its position, comprising:
connecting a volumetric fluid displacement sensitive position indicator to a control line, said control line used to operate said valve;
providing a visible indication subsea responsive to displaced hydraulic fluid volume, said displaced volume proportional to movement of said valve between an open and a closed position.

19. A valve assembly for subsea use, comprising:
a hydraulically operated flapper valve further comprising a flapper valve housing with a passage therethrough selectively closed by a flapper in said passage;
a surrounding outer housing for said flapper valve housing, said outer housing comprising flanged ends for connection to a marine riser to said passage;
at least one opening in said outer housing for sealingly connecting at least one control line for hydraulic operation of said flapper valve through said flapper valve housing.

20. The assembly of claim 19, further comprising:
a subsea position indicating assembly mounted adjacent said outer housing operably connected to said at least one control line that operates said valve.

21. The assembly of claim 20, further comprising:
said subsea position indicating assembly responsive to a variable volume of hydraulic fluid moving between said control line and said position indicating assembly to visually indicate, outside said outer housing, valve position related to said moving volume.

22. The assembly of claim 21, further comprising:
said moving volume proportional to movement of said valve between an open and a closed position.

23. The assembly of claim 22, further comprising:
said moving volume displacing an indicating piston in a position indicating housing; and
an indicating member moving with said indicating piston and extending to be visible from an opening in said position indicating housing to provide a visual indication of position for said valve.

24. The assembly of claim 23, further comprising:
said indicating piston is insensitive to pressure outside said opening by virtue of a second piston mounted to said indicating member in said position indicating housing having the same piston area as said indicating piston, with said opening in said housing between said pistons.

25. The assembly of claim 20, further comprising:
said at least one control line comprises an operating and a force closed control lines such that pressure in said operating control line opens said valve and pressure in the force closed control line closes said valve, said subsea position indicator in selective flow communication with said force close control line.

26. The assembly of claim 20, further comprising:
said at least one control line comprises an operating and a force closed control lines such that pressure in said operating control line opens the valve and pressure in the force closed control line closes said valve, said subsea position indicating assembly in selective flow communication with said operating control line.

27. The assembly of claim 20, further comprising:
said position indicating assembly providing a local signal of the position of said valve or transmitting a position signal to a remote location.

* * * * *